United States Patent [19]

Shimoda et al.

[11] Patent Number: 4,782,810
[45] Date of Patent: Nov. 8, 1988

[54] FUEL INJECTION SYSTEM FOR INTERNAL COMBUSTION ENGINE

[75] Inventors: Shigeaki Shimoda; Tatsuya Tomii; Yasunori Sasaki, all of Hiroshima, Japan

[73] Assignee: Mazda Motor Corporation, Hiroshima, Japan

[21] Appl. No.: 94,595

[22] Filed: Sep. 9, 1987

[30] Foreign Application Priority Data

Sep. 10, 1986 [JP] Japan .................. 61/213140

[51] Int. Cl.⁴ .................. F02M 25/06; F02M 51/00; F02D 41/04
[52] U.S. Cl. .................. 123/571; 123/478; 123/494
[58] Field of Search .............. 123/478, 480, 489, 494, 123/571

[56] References Cited

U.S. PATENT DOCUMENTS

| | | | |
|---|---|---|---|
| 4,306,533 | 12/1981 | Matsumoto et al. | 123/571 |
| 4,388,909 | 6/1983 | Ogasawara et al. | 123/571 X |
| 4,608,955 | 9/1986 | Ohtaki et al. | 123/571 X |
| 4,620,519 | 11/1986 | Nagao et al. | 123/492 |
| 4,624,229 | 11/1986 | Matekunas | 123/571 X |
| 4,644,926 | 2/1987 | Sakurai et al. | 123/571 X |

FOREIGN PATENT DOCUMENTS 0122239 6/1985 Japan .
0230531 11/1985 Japan .

Primary Examiner—Willis R. Wolfe
Attorney, Agent, or Firm—Fleit, Jacobson, Cohn & Price

[57] ABSTRACT

A fuel injection system for an internal combustion engine having the normal crankshaft and plurality of cylinders each with an intake passage and an exhaust passage. An intake stroke detector is provided for detecting if a particular cylinder of the engine is experiencing an intake stroke. Responsive to an intake stroke being detected, a fuel injector is actuated to inject fuel into the intake passage of the particular cylinder during its intake stroke. The engine is equipped with an exhaust gas recirculation system for recirculating a part of exhaust gases from the exhaust passage to the intake passage of each cylinder. A fuel injection timing control mechanism is provided for advancing the fuel injection timing responsive to operation of the exhaust gas recirculation system to control the fuel injection period relative to the intake stroke.

20 Claims, 11 Drawing Sheets

FUEL INJECTION SYSTEM FOR INTERNAL COMBUSTION ENGINE

BACKGROUND OF THE INVENTION

1. Field of the Invention

The present invention relates to a fuel injection system for an internal combustion engine, and more particularly to a fuel injection system for an internal combustion engine having an exhaust gas recirculation system.

2. Description of the Prior Art

A sequential fuel injection technique is known in which a fuel injection valve is located near each intake valve in the associated intake passage and is controlled to inject an amount of fuel required for one power stroke, according to engine load and engine rpm. The fuel injection is made into the intake passage after the intake valve has been opened and during the intake stroke, thereby correctly adjusting the air-fuel ratio of the mixture in the associated combustion chamber, and improving fuel economy and exhaust emissions. It has been discovered, however, that vaporization and atomization of the liquid injected fuel in such a fuel injection system are inferior to what is experienced when using a carburetor. For this reason, it has been proposed to arrange the fuel injection timing at the end of an intake stroke in each cylinder so that liquid fuel stays in an intake port a relatively long period, thereby promoting vaporization and atomization of the liquid fuel, see, for example, Japanese Unexamined Patent Publication No. 57 (1982) -108428. However, arranging the fuel injection timing all the time at the end of an intake stroke is disadvantageous because the aforementioned merits of sequential fuel injection are then destroyed. Also, an exhaust gas recirculation technique in which a part of exhaust gases is recirculated to an intake passage to reduce harmful $NO_x$ (nitrogen oxides) is known. In the exhaust gas recirculation system, recirculated exhaust gases can lower combustion temperature because exhaust gases are inert, lowering combustion temperature leads to suppressing generation of $NO_x$. Therefore, exhaust emissions can be improved under all engine load conditions by appropriate use of exhaust gas recirculation technique. However, exhaust gas recirculation has the disadvantage of lowering combustibility of the mixture. Accordingly, an engine having a sequential fuel injection system and an exhaust gas recirculation system must resolve the dichotomy between maintaining adequate combustibility and preserving the merits of sequential fuel injection.

SUMMARY OF THE INVENTION

In view of the foregoing, the primary object of the present invention is to provide an internal combustion engine having a sequential fuel injection device and an exhaust gas recirculation device in which combustibility is adequately maintained and the merits of sequential fuel injection are gained.

In accordance with the present invention, a fuel-injected internal combustion engine is provided comprising an intake stroke detecting means for detecting whether or not a cylinder of the engine is in an intake stroke, a fuel injection means for receiving the output from said intake stroke detecting means and in response thereto supplying fuel into an intake passage, an exhaust gas recirculation means for recirculating a part of exhaust gases to the intake passage, and a fuel injection timing control means for advancing fuel injection timing so that the fuel injection period overlaps with the intake stroke a relatively short period or does not overlap when said exhaust gas recirculation means is recirculating exhaust gases to the intake passage.

In the internal combustion engine of the present invention, fuel injection timing control is accomplished responsive to the operation of the exhaust gas recirculation means. When the exhaust gas recirculation means is recirculating exhaust gases to the intake passage, fuel injection timing is advanced so that the stay or dwell of liquid fuel in the intake port is extended and effective vaporization and atomization of liquid fuel can be obtained.

BRIEF DESCRIPTION OF THE DRAWINGS

The foregoing objects and advantages of the present invention will become more evident from the following detailed description of preferred embodiments when taken in conjunction with the drawings in which.

DESCRIPTION OF THE PREFERRED EMBODIMENTS

Figure 1:
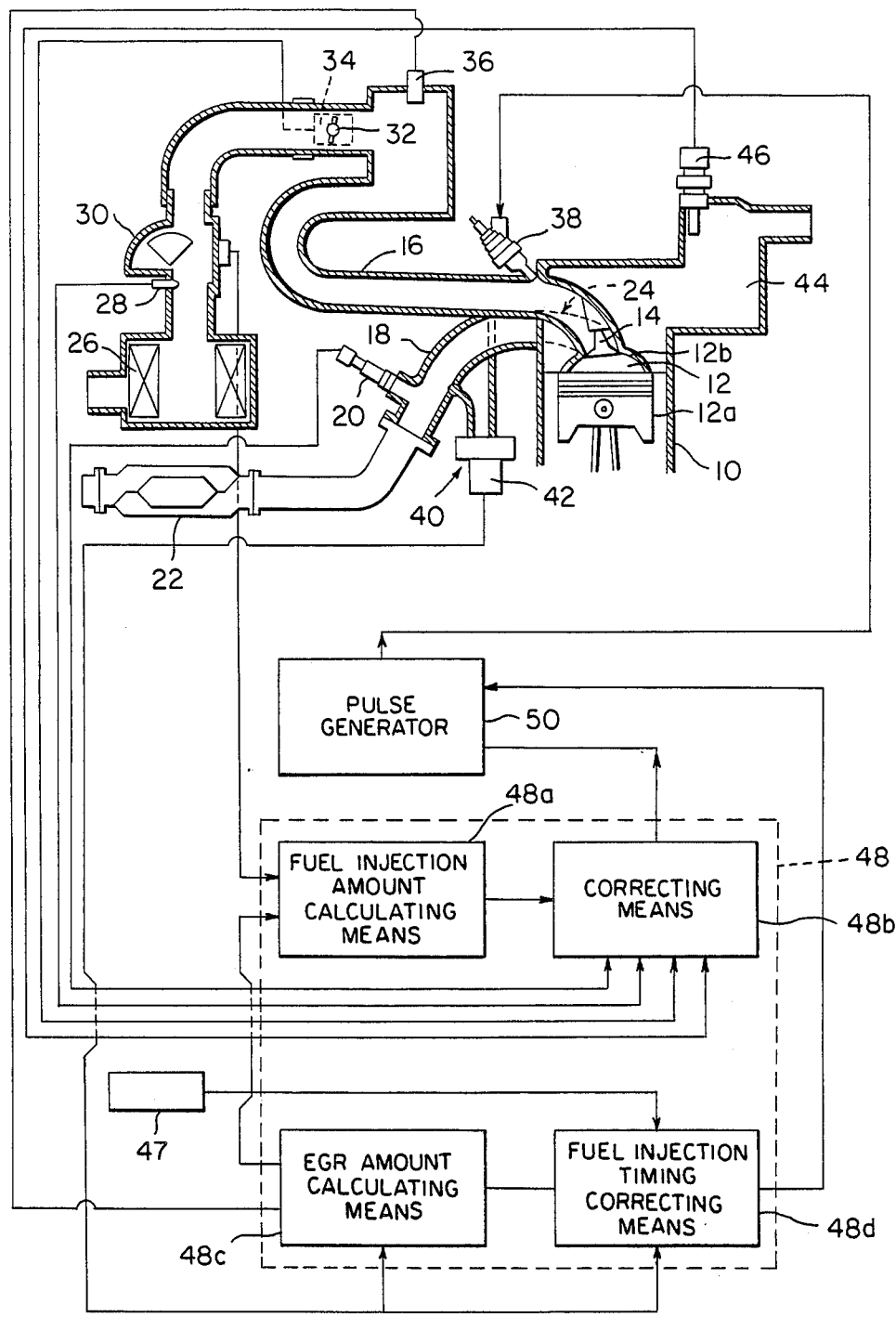
FIG. 1 is a schematic view illustrating a fuel-injected internal combustion engine arranged in accordance with a preferred embodiment of the present invention.

Referring now to the drawings, FIG. 1 through FIG. 9 show a first preferred embodiment of a fuel supplying system for an internal combustion engine 1 according to the principles and teachings of the present invention. In FIG. 1, an internal combustion chamber 12 is formed in an engine body 10, consisting of a cylinder block 12a and a cylinder head 12b. The combustion chamber 12 is connected with an intake passage 16 and an exhaust passage 18, respectively, by way of an intake valve 14 and exhaust valve (not shown). Only one cylinder is shown, but it will be appreciated by those skilled in the art that the engine 1 may comprise a plurality of cylinders, e.g., 4, 6, 8, etc. The engine is of known structure in all material respects.

In the exhaust passage 18 is provided an $O_2$ sensor 20 for detecting the concentration of oxygen in exhaust gases. A catalytic converter 22 of known design for treating exhaust gases in a conventional way is provided downstream of the $O_2$ sensor 20.

Located upstream of the intake passage 16 is an air cleaner 26. Located between passage 16 and cleaner 26 in successive downstream order from cleaner 26 are an intake air temperature sensor 28, an airflow meter 30 for detecting flow of intake air, a throttle valve 32 and throttle position sensor 34 for detecting angular position degrees of the throttle valve 32 and an intake air pressure sensor 36 to detect intake air pressure disposed in a surge tank 37 forming part of the intake passage 16. A fuel injection valve 38 is disposed or located in the downstream end of intake passage 16 to inject fuel into an intake port or region 24.

The exhaust passage 18 is connected to the intake passage 16 by way of an EGR valve 40 through which a part of the exhaust gases in the exhaust passage 18 can be recirculated into the intake passage 16 in a controlled manner. The EGR amount is detected by an EGR valve position sensor 42 which sends out an electrical signal indicative of position sensed.

Furthermore, a coolant temperature sensor 46 is provided for detecting temperature of coolant in water jacket 44 of the engine body 10.

The fuel injection control for the fuel injection valve 38 is accomplished by a pulse generator 50 and a control device 48. Control device 48 performs a series of calculations on the basis of engine rpm obtained from a crankshaft sensor 47 and signals from the $O_2$ sensor 20, the intake air temperature sensor 28, the airflow meter 30, the throttle position sensor 34, the intake air pressure sensor 36, the EGR valve position sensor 42, and the coolant temperature sensor 46.

The control device 48 comprises in a conventional array a CPU, a ROM, a RAM, and interfaces. The control device 48 is functionally divided into several means, that is, a fuel injection amount calculating means 48a for calculating fundamental injection amounts for the injection valve 38, a correcting means 48b for correcting fuel injection amounts calculated by the fuel injection amount calculating means 48a, an EGR amount calculating means 48c for calculating desired recirculation amounts of exhaust gases according to an engine driving condition, and a fuel injection timing correcting means 48d.

Figure 2:
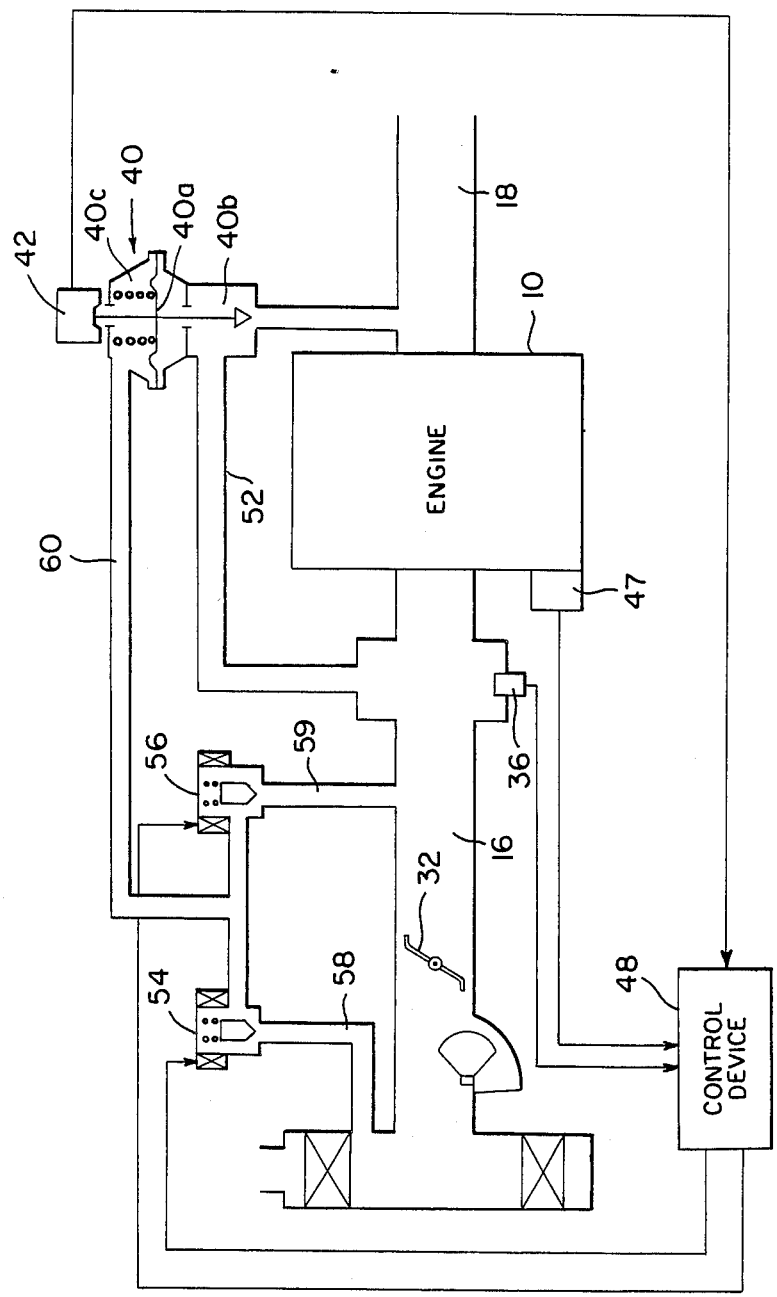
FIG. 2 is a schematic view illustrating in detail the exhaust gas recirculation device shown in FIG. 1.

FIG. 2 shows in detail the exhaust gas recirculation system of the present invention. The intake passage 16 and the exhaust passage 18 of engine 1 are connected to each other via an EGR passage 52. Interposed in the EGR passage 52 is a diaphragm type EGR valve 40 including valve element 40b for controlling the EGR amount allowed to pass through passage 52 from exhaust passage 18 to intake passage 16 at surge tank 37.

The EGR valve position sensor 42 detects the position of valve element 40b. Solenoid valves 54 and 56 are provided for driving or positioning diaphragm 40a of the EGR valve 40. The solenoid valve 54 controls communication between conduits 58 and 60 through which atmospheric pressure from air cleaner 26 is led to working chamber 40c of the ERG valve 40. The solenoid valve 56 controls communication between conduits 59 and 60 through which negative or vacuum intake pressure, taken from downstream of throttle valve 32, is led to the working chamber 40c. The control device 48c receives signals from intake air pressure sensor 36, EGR valve position sensor 42 and crankshaft sensor 47. Responsive thereto control device 48c controls solenoid valves 54 and 56 to set the valve 40b to a predetermined position by means of servo feedback control.

Figure 3:
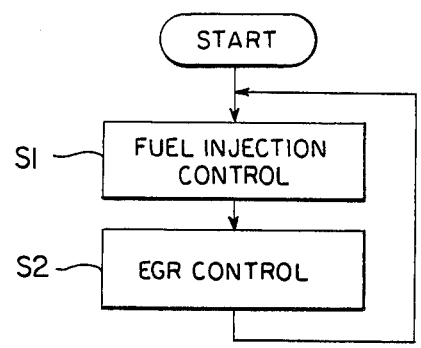
FIG. 3 is a main flow chart illustrating the operation of the control device of the present invention.
Figure 5:
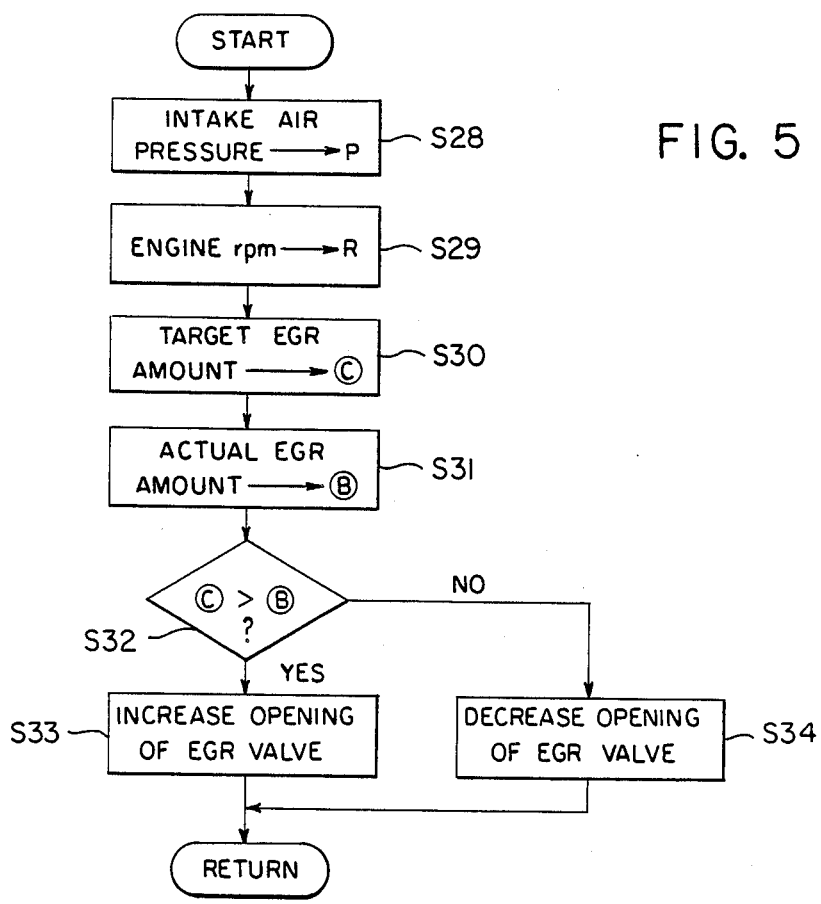
FIG. 5 is a flowchart illustrating the exhaust gas recirculation control according to the principles of the present invention.
Figure 4:
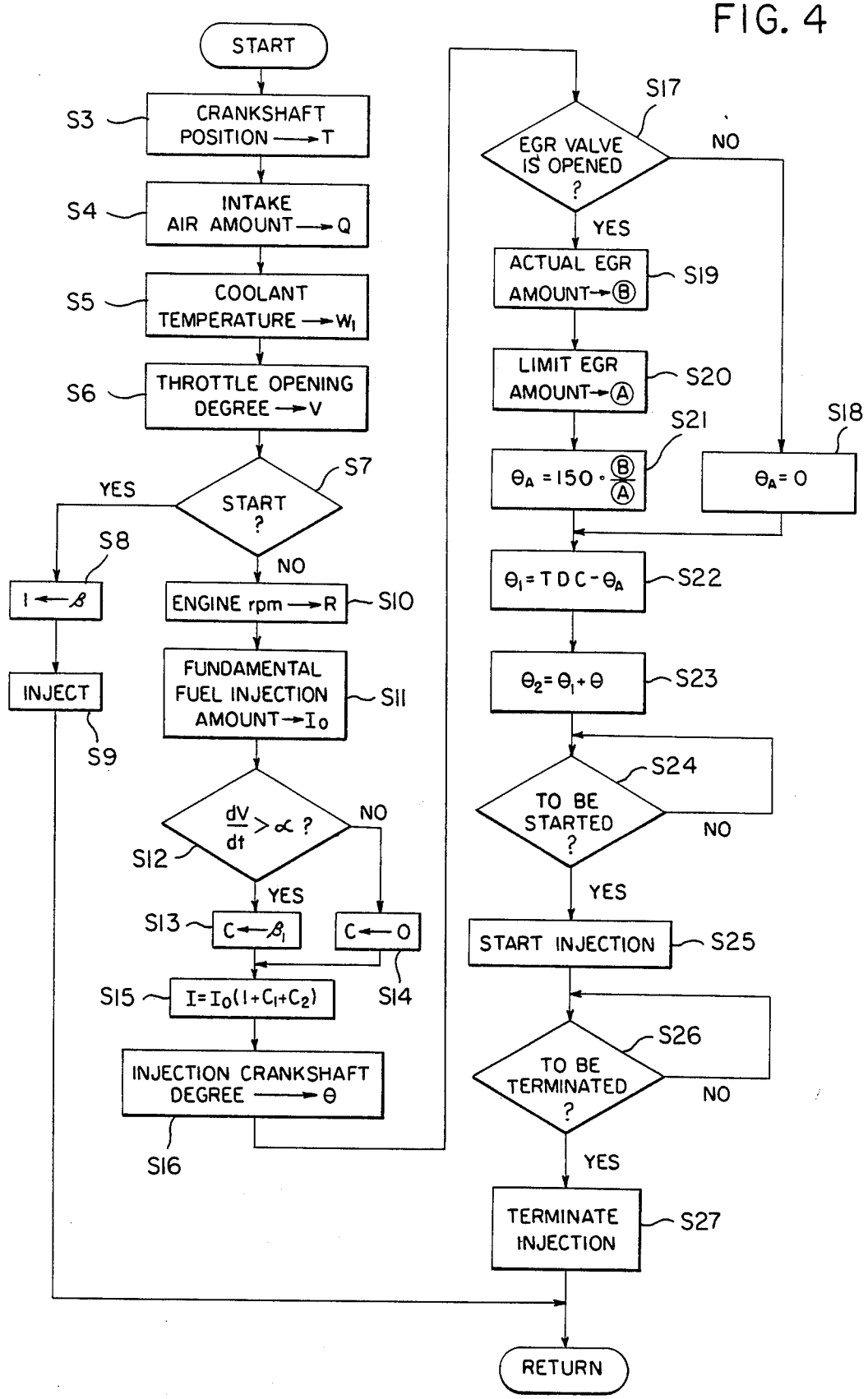
FIG. 4 is a flowchart illustrating a first preferred embodiment of the fuel injection control according to the principles of the present invention.

The first preferred embodiment of the present invention, for accomplishing the aforementioned functions and objections, is illustrated in FIGS. 3 through 9. FIG. 3 shows a main flowchart, wherein fuel injection and exhaust gas recirculation are controlled in step S1 and step S2, respectively. Details of these controls are illustrated in FIG. 4 and FIG. 5.

When the engine 1 is started, control device 48 reads signals from crankshaft sensor 47, airflow meter 30, coolant temperature sensor 46, and throttle position sensor 34. The values of signals are stored in registers T, Q, $W_1$ and V, respectively (steps S3 to S6). Then, control device 48 determines whether or not the engine is being started in step S7. If it is determined that the engine is being started, control device 48 proceeds to step S8 and stores a predetermined starting fuel injection amount $\beta$ in a register I. In step S9, the control device 48 produces a starting injection pulse according to the value of the register I and delivers the starting injection pulse to preselected fuel injection valves 38. Thereafter, control device 48 returns to the main flow and returns to start.

Figure 6:
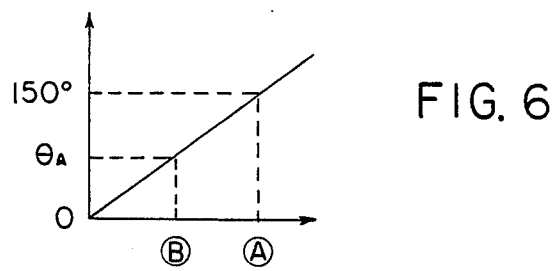
FIG. 6 shows a graph illustrating the characteristics for determining fuel injection timing for the embodiment shown in FIG. 4.
Figure 6A:
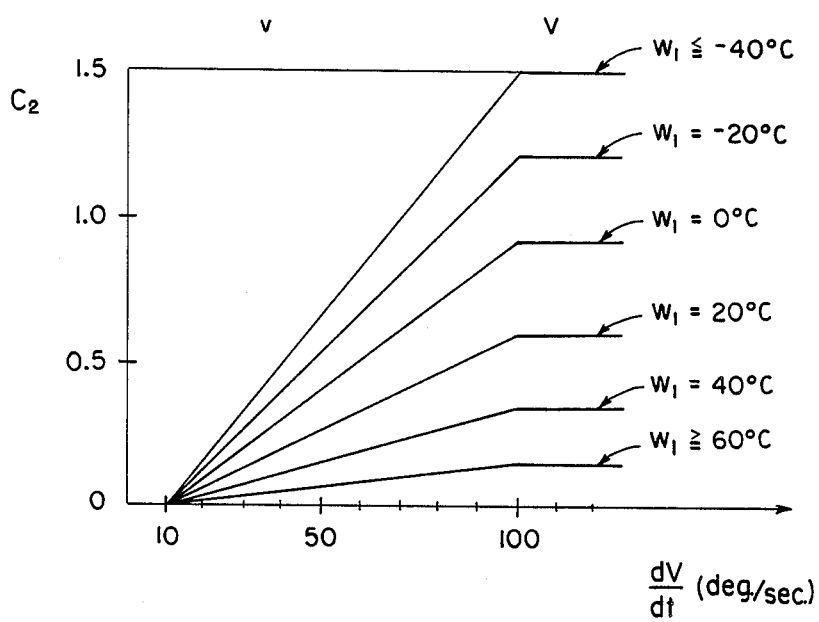
FIG. 6a is a graph illustrating how $C_2$ is determined relative to the acceleration of the throttle valve for different temperatures.
Figure 6B:
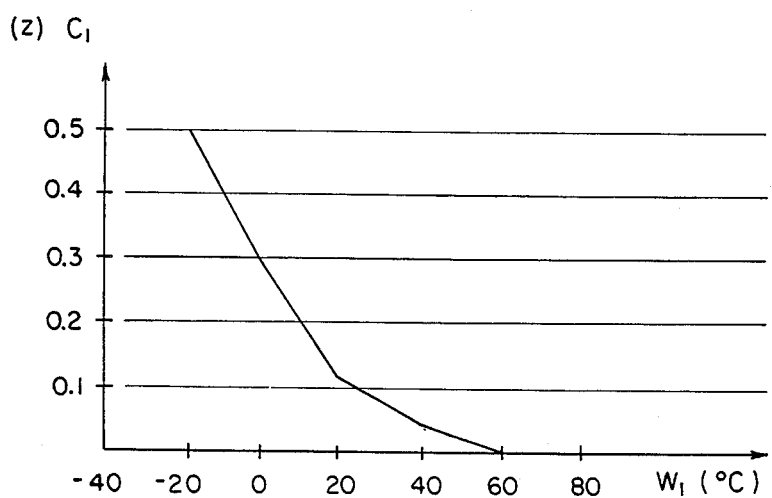
FIG. 6b is a graph illustrating how $C_1$ function for temperature compensation is determined.

After the engine is started, control device 48 proceeds through steps 3–7 to step S10. In step S10, control device 48 calculates engine rpm from the crankshaft angle stored in the register T and stores it in a register R. Then, in step S11, control device 48 calculates a fundamental fuel injection amount $I_o$ on the basis of engine rpm stored in the register R and the amount of intake air stored in the register Q, and stores it in the register $I_o$, e.g., $I_o = K \times Q/R$, where Q is the intake air amount $m^3/hr$, R is rpm and K is a constant equal to 1730 msec/$m^3$. In step S12, control device 48 calculates acceleration dV/dt based on the contents of the register V, and determines whether or not the acceleration dV/dt is larger than a preset value $\alpha$, e.g., 10 deg/sec, thereby determining whether or not the vehicle is being accelerated. When it is determined that the vehicle is being accelerated control device 48 proceeds to step S13 and stores a preset value $\beta_1$ in a register $C_2$, e.g., $\beta_1 = 0.5$. Otherwise, control device 48 proceeds to step S14 and nullifies the value of the register $C_2$, resets to zero. Said preset value $\beta_1$ may be a fixed value as noted or may be changed according to the extent of the acceleration, see FIG. 6a. In the next step S15, control device 48 calculates the actual fuel injection amount by multiplying the fundamental fuel injection amount by a factor comprised of $C_1$, a function for temperature compensation as determined from the graph of $C_1$ versus temperature ($W_1$), see FIG. 6b, and $C_2$ a function of acceleration per FIG. 6a. Thereafter, the calculated actual fuel injection amount, i.e., $I = I_o(1 + C_1 + C_2)$, is stored in the register I. Then, in step S16, control device 48 determines a fuel injection crankshaft angle $\theta$ on the basis of the actual fuel injection amount stored in the register I and stores it in a register $\theta$.

Figure 8:
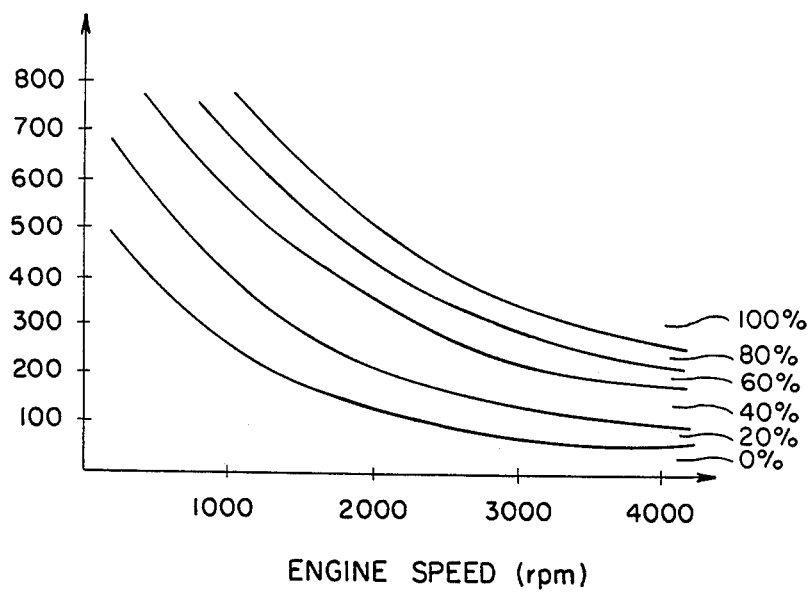
FIG. 8 is a graph showing the characteristics of limit exhaust gas recirculation amount.

In step S17, control device 48 determines whether or not EGR valve 40 is opened. If it is determined that the EGR valve 40 is not opened, control device 48 proceeds to step S18 and nullifies the value of the register $\theta_A$ (mentioned later). If it is determined that the EGR valve 40 is opened, control device 48 proceeds to step S19 and determines an actual EGR ratio according to the signal from the EGR valve position sensor 42, and stores this value in the register $\circledR$. In step S20, control device 48 calculates a limit EGR ratio on the basis of engine rpm and engine load, and stores this value in the register $\circledA$. The limit EGR ratio can be experimentally obtained, and its characteristic is shown in FIG. 8. The "EGR limit" means a maximum or limit EGR ratio for which combustibility can be maintained within acceptable level. Therefore, $$\text{limit } EGR = \left( \frac{EGR \text{ amount}}{\text{intake air (or mixture) amount}} \right)_{max}$$

FIG. 8 is a plot of engine speed (rpm) versus intake air pressure in mm of Hg showing opening degrees of EGR valve 40 in terms of percentage of opening with 100% being fully open and 0% being closed for achieving the limit EGR ratio under each engine driving condition.

Then, in step S21, control device 48 calculates a fuel injection advance amount on the basis of the actual EGR ratio and the limit EGR ratio. Then, the fuel injection advance amount, i.e., 150·$\circledR$/$\circledA$, is stored in register $\theta_A$. The greater the actual EGR ratio increase, the larger $\theta_A$ becomes. (See FIG. 6.) In next step S22, a fuel injection starting timing is determined by subtracting $\theta_A$ from the top dead center TDC (of the crankshaft) during the intake stroke; this value is stored in the register $\theta_1$. In step S22, a fuel injection terminating timing $\theta_2$ is determined by adding $\theta$ to the fuel injection starting timing $\theta_1$, and this value is stored in register $\theta_2$.

Control unit 48 stays in step S24 until the fuel injection starting timing $\theta_1$ as determined in the step S22 comes. At fuel injection timing 81, the control device 48 delivers a starting signal to the fuel injection valve 38 in step S25, and stays in step S26 until fuel injection terminating timing $\theta_2$ comes. When fuel terminating timing $\theta_2$ comes, control device 48 delivers a terminating signal to the fuel injection valve 38 in step S27 and then control device 48 returns to start.

Figure 9:
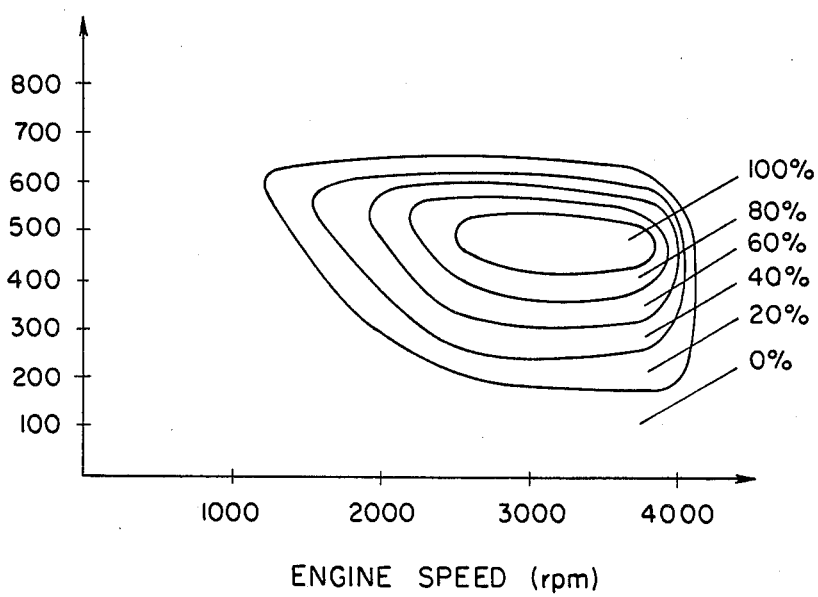
FIG. 9 is a graph showing the characteristics of target exhaust gas recirculation amount.

FIG. 5 is a flowchart showing the exhaust gas recirculation control. When the program starts, control device 48 reads signals from intake air pressure sensor 36 and stores the value of the signal in register P in step S28. Then, engine rpm is again calculated according to the signal received from crankshaft sensor 47 and stored in the register R in step S29. Thereafter, in step S30, control device 48 calculates a target EGR ratio on the basis of engine rpm and engine load, and stores this value in the register $\circledC$. The target EGR ratio can be predetermined or designed according to the engine performance and its characteristic is shown in FIG. 9. FIG. 9 is a plot of engine speed (rpm) versus intake air pressure (mm of Hg) showing opening degrees of EGR valve 40 for achieving the target EGR ratio under each engine driving condition with the openings of valve 40 being shown in percentage terms with 100% being fully open and 0% being closed. In step S31, the actual EGR ratio is again calculated, and this value is stored in the register $\circledB$.

Then, in step S32, control device 48 determines whether or not the target EGR ratio is greater than the actual EGR ratio. If the target EGR ratio is greater than the actual EGR ratio, control device 48 proceeds to step S33 and delivers a signal to solenoid valves 54 and 56 for increasing the opening of EGR valve 40. If the target EGR ratio i not greater than the actual EGR ratio, control device 48 proceeds to step S34 and delivers a signal to solenoid valves 54 and 56 for decreasing the opening of EGR valve 40. Then, control device 48 returns to start.

Figure 7:
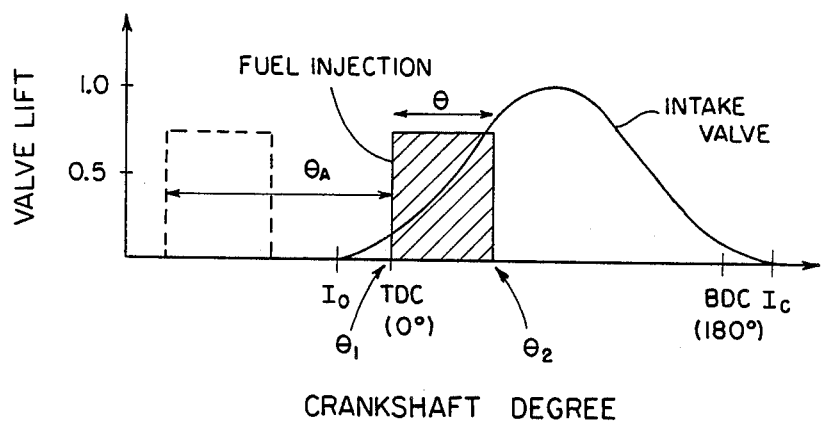
FIG. 7 is a graph showing the fuel injection timing for the embodiment shown in FIG. 4.

As shown in FIG. 7, a timing curve of the opening of intake valve 14, intake valve 14 begins to open at time $I_o$ slightly ahead of top dead center TDC of the crankshaft and is fully closed at time $I_c$ slightly after bottom dead center BDC. Fuel injection starts at time $\theta_1$ (the top dead center TDC) and terminates at time $\theta_2$, see shaded area. When EGR valve 40 is opened, fuel injection starting time $\theta_1$ is advanced a time $\theta_A$ according to the actual EGR amount, see dotted lined area.

Figure 10:
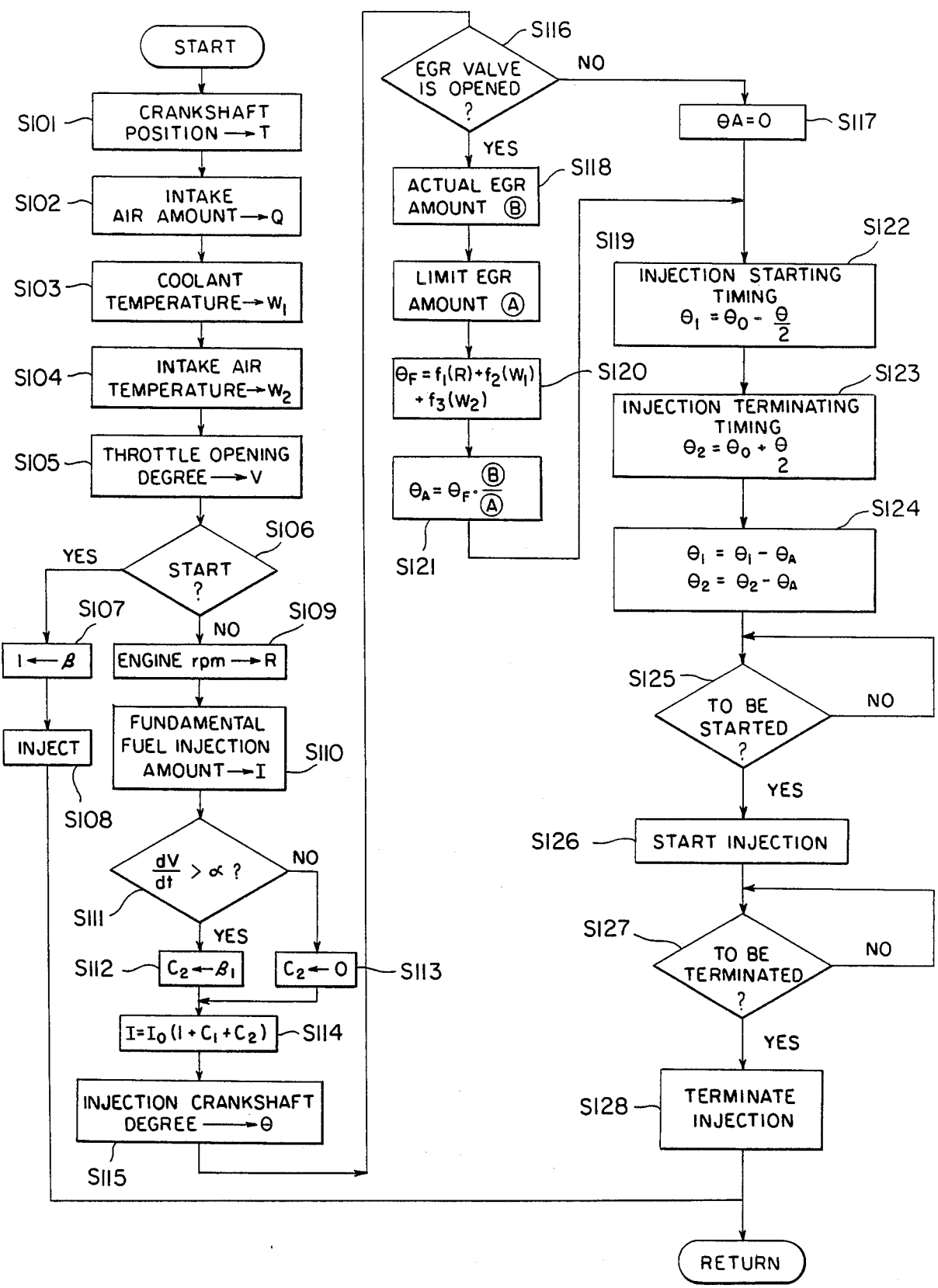
FIG. 10 is a flowchart like that of FIG. 4 illustrating a second preferred embodiment of the fuel injection control according to the principles of the present invention.

FIG. 10 through FIG. 14 illustrate a second preferred embodiment of the present invention. FIG. 10 shows a flowchart for fuel injection control and is the same as FIG. 4 except for steps S104, S120, S121, S122, S123 and S124. In step S104, control device 48 reads the signal from the intake air temperature sensor 28 and stores the value of the signal in the register $W_2$. After step S119 (corresponding to step S20 in FIG. 4), control device 48, in step S120, calculates a fundamental fuel injection advancing amount $\theta_F$. $\theta_F$ is calculated according to the following equation:

$$\theta_F = f_1(R) + f_2(W_1) + f_3(W_2)$$

Figure 12:
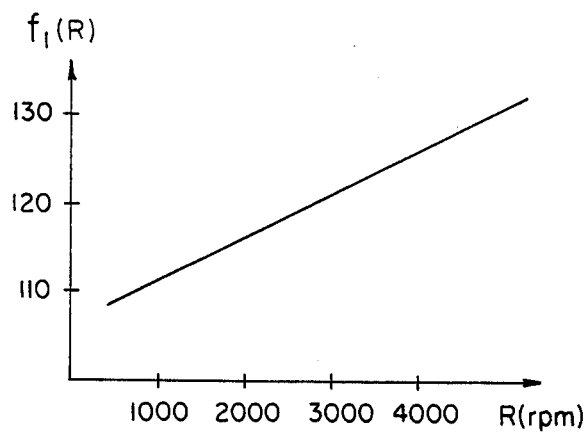
FIGS. 12, 13 and 14 are graphs showing, respectively, the characteristics for determining fuel injection timing o the embodiment of FIG. 10.
Figure 13:
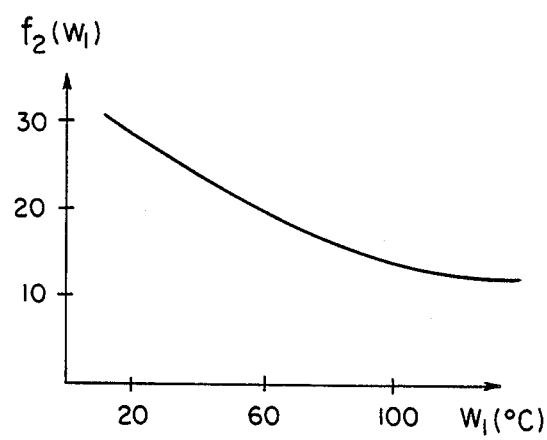
Figure 14:
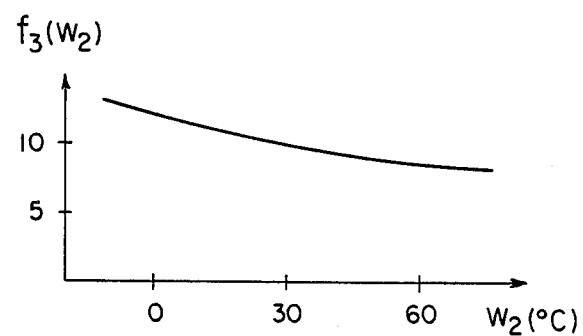

That is, $\theta_F$ is a function of engine rpm R, coolant temperature $W_1$ and intake air temperature $W_2$. Characteristics of $f_1(R)$; $f_2(W_1)$ and $f_3(W_2)$ are shown in FIGS. 12, 13 and 14, respectively. The greater the engine rpm increases, the larger $f_1(R)$ becomes. The higher the coolant temperature $W_1$ rises, the smaller $f_2(W_1)$ becomes. The higher the intake air temperature $W_2$ rises, the smaller $f_3(W_2)$ becomes. These functions are determined so that vaporization and atomization of fuel are not affected adversely by peripheral conditions, such as, engine driving conditions and engine temperature.

Figure 11:
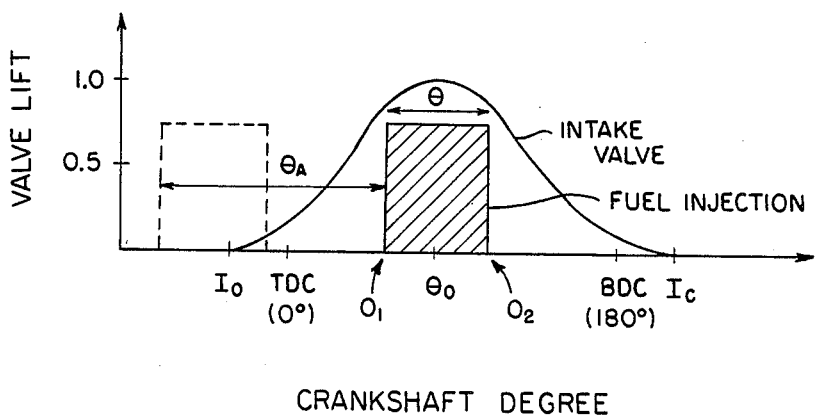
FIG. 11 is a graph showing the fuel injection timing of the embodiment of FIG. 10.

In next step S121, control device 48 calculates the fuel injection advance amount, i.e., $\theta_F \cdot \circledB / \circledA$, and stores it in register $\theta_A$. In next step S122, the fuel injection starting timing $\theta_1$ is determined and, thereafter, the fuel injection terminating timing $\theta_2$ is determined in step S123. The fuel injection starting timing $\theta_1$ is determined by subtracting $\theta/2$ from $\theta_0$ ($\theta_0$ is the timing at which the piston speed becomes maximum, see FIG. 11) of the fuel injection time, and the fuel injection terminating timing 82 is determined by adding $\theta/2$ to the middle $\theta_0$ of the fuel injection time. $S_O$, $\theta_0$ is set substantially at the middle of the intake stroke. This is advantageous in order to effect the stratified charge. Furthermore, in step S124, the fuel injection starting timing $\theta_1$ and the fuel injection terminating timing $\theta_2$ are corrected by the fuel injection advance amount $\theta_A$. That is, $\theta_1 = \Theta_1 - \theta_A$, $\theta_2 = \theta_2 - \theta_A$. FIG. 11, similar to FIG. 7, shows a timing curve for this embodiment.

Figure 15:
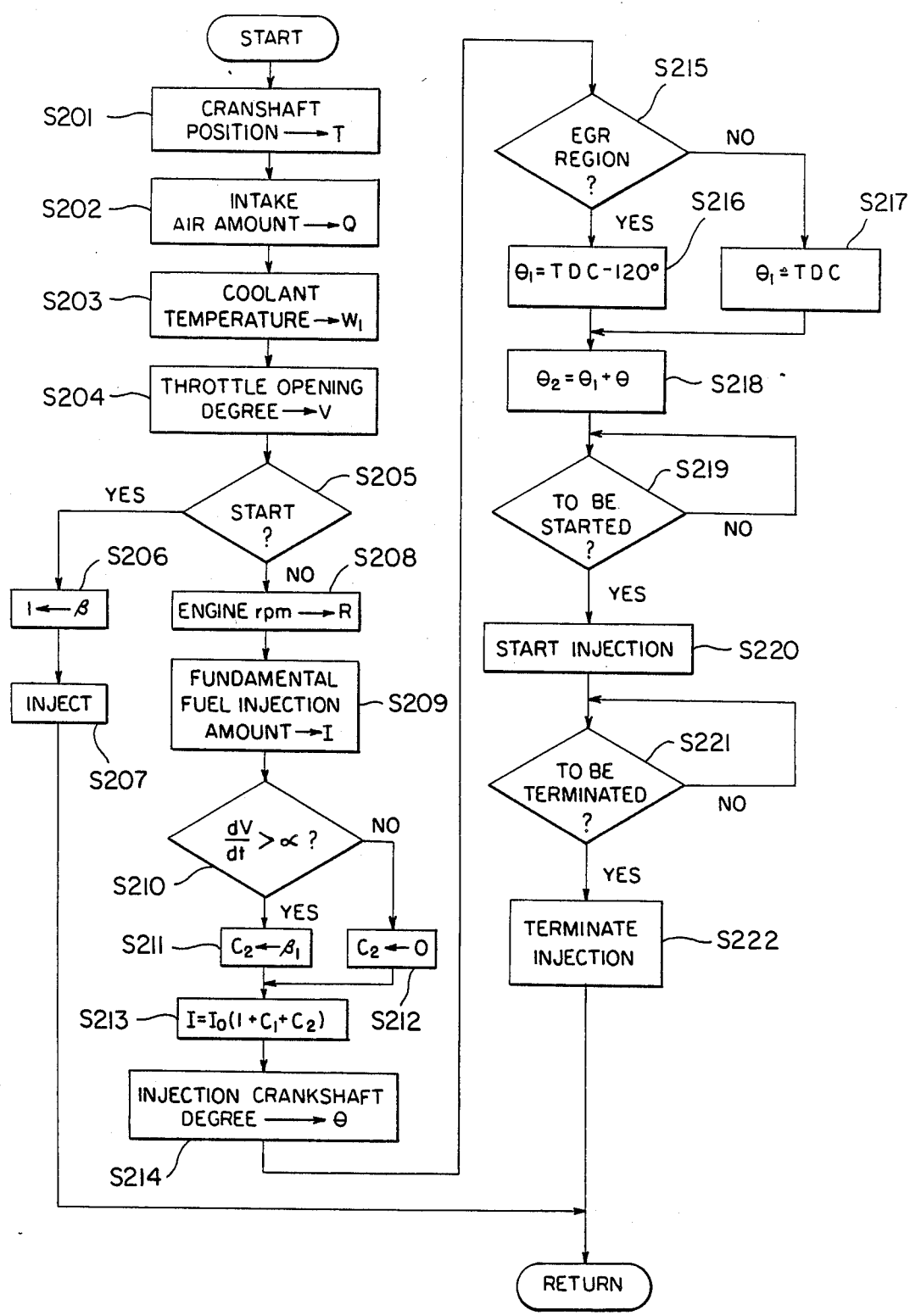
FIG. 15 is a flowchart like that of FIG. 4 illustrating a third preferred embodiment of the fuel injection control according to the principles of the present invention.
Figure 16:
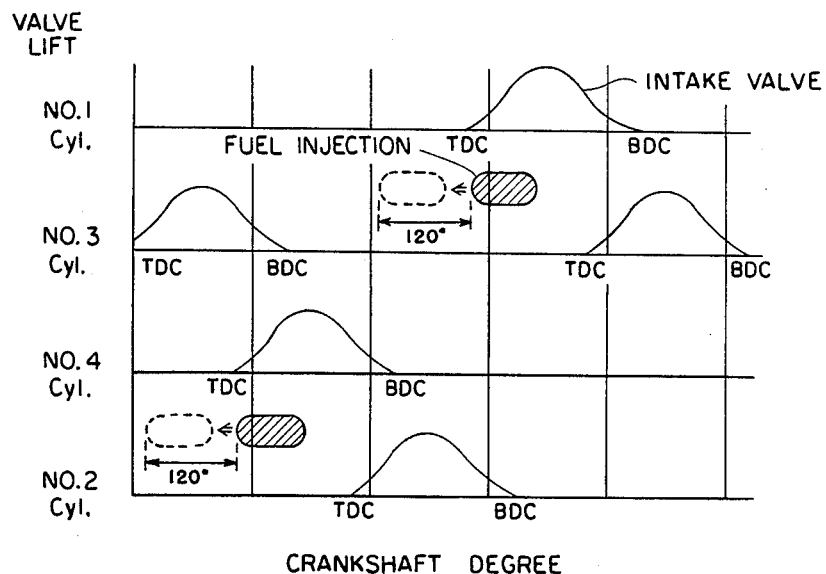
FIG. 16 is a timing chart illustrating the fuel injection timing of the embodiment of FIG. 15.
Figure 17:
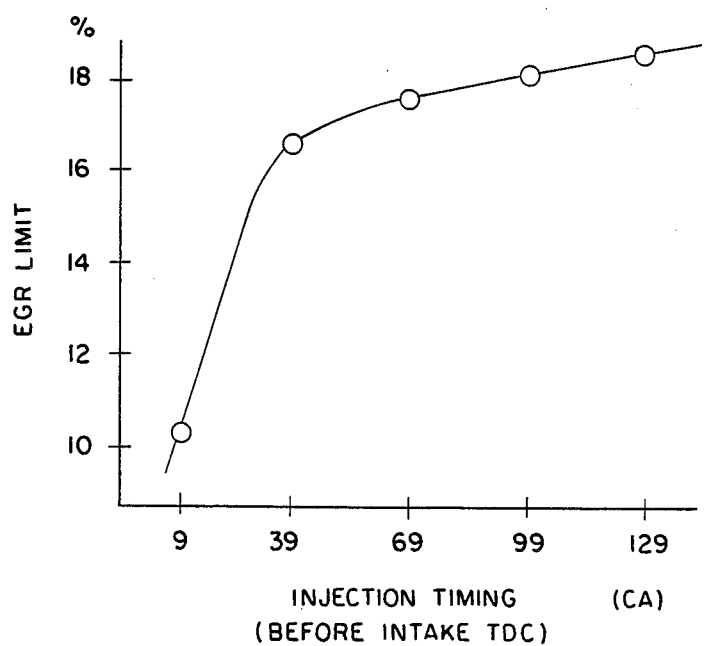
FIG. 17 is a graph showing experimental data concerning the embodiment of FIG. 15.

FIG. 15 through FIG. 17 illustrate a third preferred embodiment of the present invention. FIG. 15 shows a flowchart for fuel injection control and is the same as FIG. 4 except for steps S215, S216, S217 and S219. In step S215, control device 48 determines whether or not the engine is being operated in the EGR region. It may be judged not only directly from the position of the EGR valve 40 but also indirectly from driving conditions, such as engine speed and engine load. If the engine is being operated in the EGR region the fuel injection starting timing $\theta_1$ is determined by subtracting 120° from the top dead center TDC in step S216. If it is determined not to be operating in the EGR region, the fuel injection starting timing $\theta_1$ is just set at the top dead center TDC in step S217. Step S218 sets the fuel injection terminating timing $\theta_2$ as in FIG. 4.

In steps S219 and S220, control device 48 stays in step S219 until the fuel injection starting timing $\theta_1$ comes and, then, delivers the starting signal to fuel injection valve 38. Fuel injection of this embodiment is controlled as shown in FIG. 16. The engine has four cylinders and No. 1 cylinder and No. 3 cylinder are controlled to be injected fuel at a first injection timing and No. 4 cylinder and No. 2 cylinder are controlled to be injected fuel at a second injection timing. Fuel injector valves 38 for No. 1 cylinder and No. 4 cylinder are controlled to inject fuel during their intake strokes, whereas injector valves 38 for No. 2 cylinder and No. 3 cylinder are controlled to inject fuel in advance of intake strokes. If it is judged that the engine is operating in the EGR region, the fuel injection timing is advanced by 120° as shown in FIG. 16 by the dotted lined areas.

FIG. 17 shows experimental results obtained from running the third embodiment of the present invention. EGR limits are plotted versus fuel injection timings. The engine was running at 1500 rpm with an intake pressure of 350 mm Hg. As can be well appreciated from FIG. 17, good results are obtained when the fuel injection timing is set at near 120° before top dead center.

Whereas the present invention has been shown and described in terms of specific preferred embodiments, various changes and modifications which do not depart from the spirit and scope of the invention will be obvious to those skilled in the art. Such are deemed to fall within the purview of the teachings of the present invention.

We claim:

1. A fuel injection system for an internal combustion engine comprising:
   (a) an engine having a crankshaft and a plurality of cylinders each with an intake passage and an exhaust passage;
   (b) intake stroke detecting means for detecting if a cylinder of said engine is experiencing an intake stroke;
   (c) fuel injection means actuated responsive to said intake stroke detecting means for injecting fuel into the intake passage of said cylinder during intake stroke of said cylinder;
   (d) exhaust gas recirculation means for recirculating a part of exhaust gases from the exhaust passage to the intake passage of said cylinder; and
   (e) fuel injection timing control means for advancing fuel injection timing responsive to operation of said exhaust gas recirculation means to control the fuel injection period relative to the intake stroke, said fuel injection timing control means starting fuel injection during intake stroke when said exhaust gas recirculation means is not operating, and before intake stroke when said exhaust gas recirculation means is operating.

2. A fuel injection system for an internal combustion engine as defined in claim 1 in which said exhaust gas recirculation means includes an EGR valve and said fuel injection timing control means is actuated responsive to the position of said EGR valve.

3. A fuel injection system for an internal combustion engine as defined in claim I in which said fuel injection timing control means provides a maximum advance of about 150° before top dead center of the crankshaft.

4. A fuel injection system for an internal combustion engine as defined in claim 1 in which said fuel injection timing control means determines the advance of fuel injection timing on the basis of the ratio of the amount of actual exhaust gas recirculation and a limit amount of exhaust gas recirculation.

5. A fuel injection system for an internal combustion engine according to claim 1 in which said fuel injection timing control means starts fuel injection at a predetermined advance before intake stroke when said exhaust gas recirculation means is operating.

6. A fuel injection system for an internal combustion engine comprising:
   (a) an engine having a crankshaft and a plurality of cylinders each with an intake passage and an exhaust passage;
   (b) intake stroke detecting means for detecting if a cylinder of said engine is experiencing an intake stroke;
   (c) fuel injection means actuated responsive to said intake stroke detecting means for injecting fuel into the intake passage of said cylinder during intake stroke of said cylinder;
   (d) exhaust gas recirculation means for recirculating a part of exhaust gases from the exhaust passage to the intake passage of said cylinder; and
   (e) fuel injection timing control means for advancing fuel injection timing responsive to operation of said exhaust gas recirculation means to control the fuel injection period relative to the intake stroke, said fuel injection timing control means providing a maximum advance of about 150° before top dead center of the crankshaft.

7. A fuel injection system for an internal combustion engine as defined in claim 6 in which said fuel injection timing control means starts fuel injection during intake stroke when said exhaust gas recirculation means is not operating, and before intake stroke when said exhaust gas recirculation means is operating.

8. A fuel injection system for an internal combustion engine as defined in claim 6 in which said fuel injection timing control means determines the advance of fuel injection timing on the basis of the ratio of the amount of actual exhaust gas recirculation and a limit amount of exhaust gas recirculation.

9. A fuel injection system for an internal combustion engine according to claim 6 in which said fuel injection timing control means starts fuel injection at a predetermined advance before intake stroke when said exhaust gas recirculation means is operating.

10. A fuel injection system for an internal combustion engine as defined in claim 6 in which said exhaust gas recirculation means includes an EGR valve and said fuel injection timing control means is actuated responsive to the position of said EGR valve.

11. A fuel injection system for an internal combustion engine comprising:
(a) an engine having a crankshaft and a plurality of cylinders each with an intake passage and an exhaust passage;
(b) intake stroke detecting means for detecting if a cylinder of said engine is experiencing an intake stroke;
(c) fuel injection means actuated responsive to said intake stroke detecting means for injecting fuel into the intake passage of said cylinder during intake stroke of said cylinder;
(d) exhaust gas recirculation means for recirculating a part of exhaust gases from the exhaust passage to the intake passage of said cylinder; and
(e) fuel injection timing control means for advancing fuel injection timing responsive to operation of said exhaust gas recirculation means to control the fuel injection period relative to the intake stroke, said fuel injection timing control means determining the advance of fuel injection timing on the basis of the ratio of the amount of actual exhaust gas recirculation and a limit amount of exhaust gas recirculation.

12. A fuel injection system for an internal combustion engine as defined in claim 11 in which said fuel injection timing control means starts fuel injection during intake stroke when said exhaust gas recirculation means is not operating, and before intake stroke when said exhaust gas recirculation means is operating.

13. A fuel injection system for an internal combustion engine as defined in claim 11 in which said fuel injection timing control means provides a maximum advance of about 150° before top dead center of the crankshaft.

14. A fuel injection system for an internal combustion engine according to claim 11 in which said fuel injection timing control means starts fuel injection at a predetermined advance before intake stroke when said exhaust gas recirculation means is operating.

15. A fuel injection system for an internal combustion engine as defined in claim 11 in which said exhaust gas recirculation means includes an EGR valve and said fuel injection timing control means is actuated responsive to the position of said EGR valve.

16. A fuel injection system for an internal combustion engine comprising:
(a) an engine having a crankshaft and a plurality of cylinders each with an intake passage and an exhaust passage;
(b) intake stroke detecting means for detecting if a cylinder of said engine is experiencing as intake stroke;
(c) fuel injection means actuated responsive to said intake stroke detecting means for injecting fuel into the intake passage of said cylinder during intake stroke of said cylinder;
(d) exhaust gas recirculation means for recirculating a part of exhaust gases from the exhaust passage to the intake passage of said cylinder; and
(e) fuel injection timing control means for advancing fuel injection timing responsive to operation of said exhaust gas recirculation means to control the fuel injection period relative to the intake stroke, said fuel injection timing control means starting fuel injection at a predetermined advance before intake stroke when said exhaust gas recirculation means is operating and relative to fuel injection when exhaust gas recirculation means is not operating.

17. A fuel injection system for an internal combustion engine as defined in claim 16 in which said exhaust gas recirculation means includes an EGR valve and said fuel injection timing control means is actuated responsive to the position of said EGR valve.

18. A fuel injection system for an internal combustion engine as defined in claim 16 in which said fuel injection timing control means provides a maximum advance of about 150° before top dead center of the crankshaft.

19. A fuel injection system for an internal combustion engine as defined in claim 16 in which said fuel injection timing control means determines the advance of fuel injection timing on the basis of the ratio of the amount of actual exhaust gas recirculation and a limit amount of exhaust gas recirculation.

20. A fuel injection system for an internal combustion engine as defined in claim 16 in which said fuel injection timing control means starts fuel injection during intake stroke when said exhaust gas recirculation means is not operating, and before intake stroke when said exhaust gas recirculation means is operating.

* * * * *